Jan. 5, 1965   A. M. DIAZ   3,164,194
SUGAR CANE CART WHEEL
Filed June 28, 1963   2 Sheets-Sheet 1
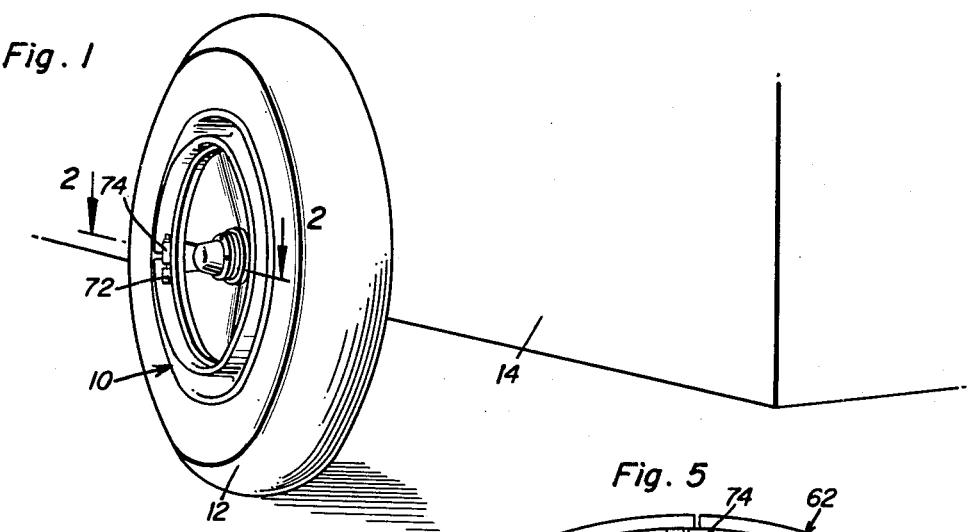
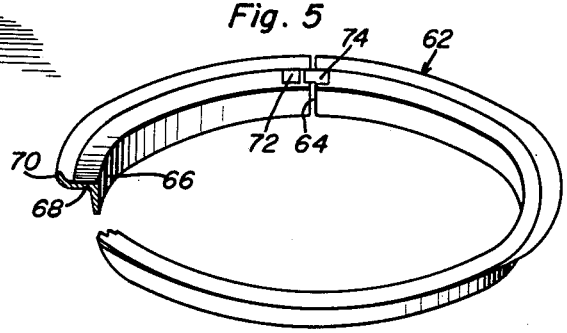
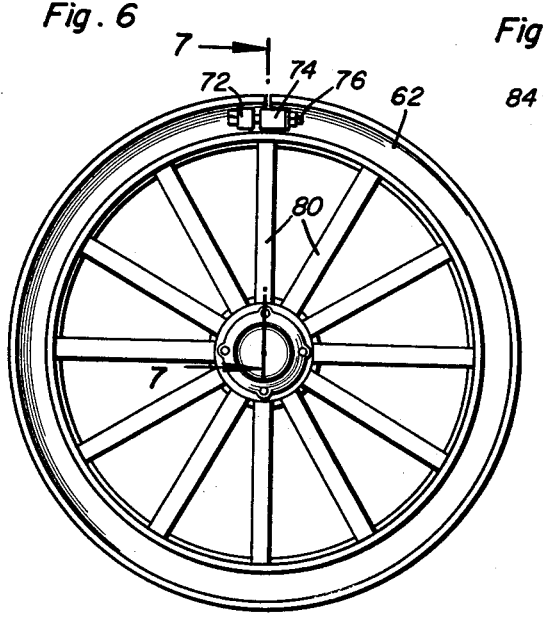
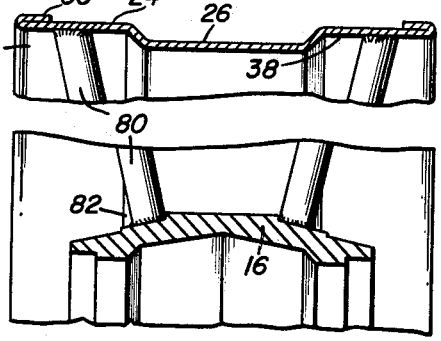
Arcadio M. Diaz
INVENTOR.

Jan. 5, 1965

A. M. DIAZ 3,164,194

SUGAR CANE CART WHEEL

Filed June 28, 1963

Arcadio M. Diaz
INVENTOR.

3,164,194
SUGAR CANE CART WHEEL
Arcadio M. Diaz, Hialeah, Fla., assignor to Inter-American Transport Equipment Co., Miami, Fla., a corporation of Florida
Filed June 28, 1963, Ser. No. 291,392
5 Claims. (Cl. 152—407)

This invention comprises a novel and useful sugar cane cart wheel and more specifically relates to a wheel construction for pneumatic tires which although specifically adapted for use with sugar cane carts is also capable of general use in connection with other vehicles and apparatuses.

The primary object of this invention is to provide a wheel construction for pneumatic tires capable of carrying very heavy loads and which shall have a great resistance to axial or lateral shocks imparted to the wheel during heavy usage.

A further and more specific object of the invention is to provide a heavy duty wheel construction for pneumatic tires in which the rim shall be secured to the hub of the wheel in an extremely rigid and sturdy manner by means of a pair of disks which are relatively convergent from the rim to the hub and which are fixedly bonded as by welding to both the rim and the hub.

Yet another purpose of the invention is to provide a wheel construction of the heavy duty type and which will securely retain and mount thereon relatively large sizes of pneumatic tires and yet will permit the easy mounting or demounting of the tires upon the wheel.

A still further and more specific object of the invention is to provide a wheel construction in accordance with the preceding objects wherein the rim of the wheel shall have its marginal edges folded with a 180 degree bend back upon the rim to provide upon the exterior surfaces thereof marginal flanges together with a pair of removable retaining flanges engageable upon the exterior surface of the rim and abutting against the inner edges of the marginal flanges for retaining the beads of a tire therebetween.

Still another specific object of the invention is to provide a wheel constructed in accordance with the preceding objects which shall have as a safety feature an improved locking means for causing the retaining flanges to frictionally and compressively grip the cylindrical exterior surface of the rim whereby to afford an additional means to secure the retaining flanges upon the rim in addition to the inturned marginal edges of the rim against which the retaining flanges abut.

Still another specific object of the invention is to provide a wheel construction as set forth in the foregoing objects wherein there is provided an improved and simplified manner in which a pair of disks or two sets of spokes may be intimately bonded or welded at their inner ends to the hub of the wheel and at their outer ends to the inside surface of the cylindrical rim of the wheel.

And a final important object of the invention to be specifically enumerated herein resides in the provision of a wheel construction in accordance with the foregoing objects wherein the ends of the rim supporting disks are provided with apertures by which they may be spot welded to retaining plates which in turn are welded upon the hub of the wheel construction.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view showing a preferred embodiment of a wheel construction in accordance with this invention mounted upon a cart which may be a sugar cane cart for supporting the latter;

FIGURE 5 is a perspective view parts being broken away of one of the retaining flanges of the invention, the fastening means being omitted from the fastening lugs therein;

Figure 2:
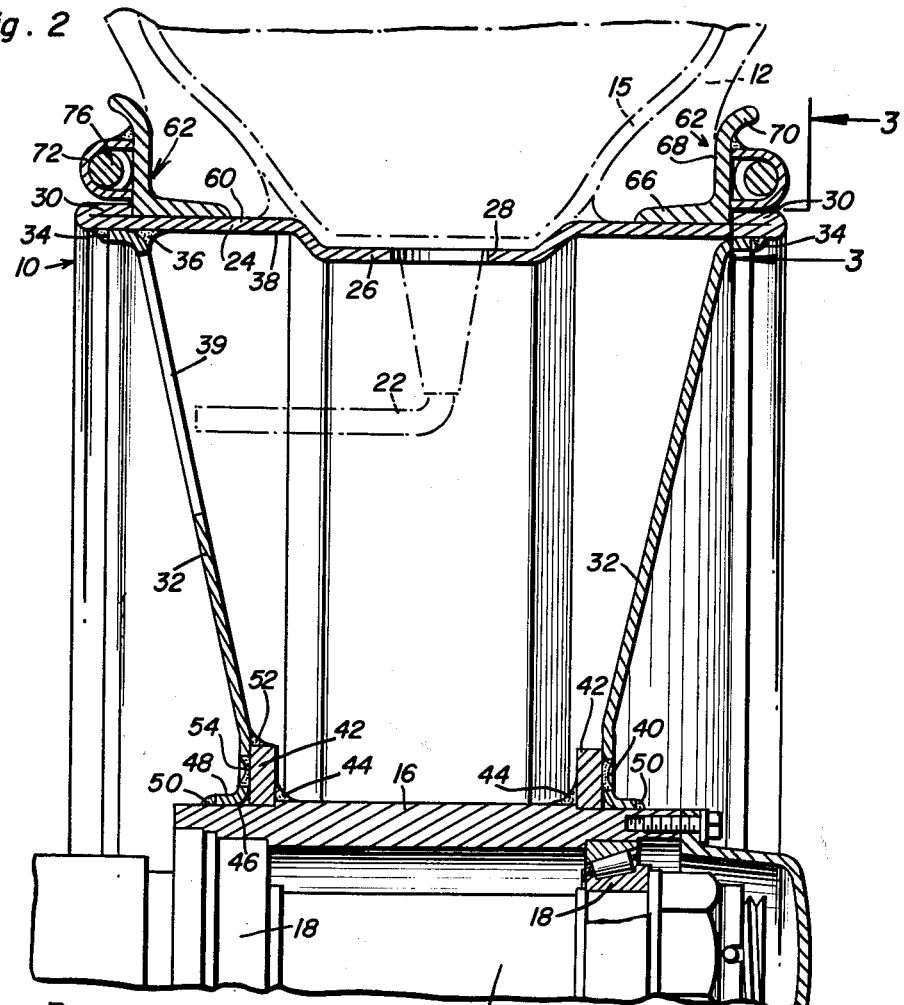
FIGURE 2 is a detailed view taken upon an enlarged scale substantially upon the plane indicated by the section line 2—2 of FIGURE 1 and showing the construction of the wheel, the mounting of the wheel upon an axle being shown and the mounting of a pneumatic tire upon the wheel being indicated in dotted lines therein.

FIGURE 6 is a side elevational view of a modified construction in which the set of spokes is employed in lieu of the solid supporting disks of the wheel; and FIGURE 7 is a detailed view taken upon an enlarged scale in vertical section substantially upon the plane indicated by section line 7—7 of FIGURE 6 with parts broken away and showing the disposition of the two sets of spokes and their connection to the hub and rim of the wheel.

Indicated generally by the numeral 10 is a wheel construction in accordance with the principles of this invention and upon which is shown mounted a pneumatic tire 12, the numeral 14 indicating a portion of a vehicle, such as a sugar cane cart, which is supported by the wheel. A sugar cane cart is mentioned not because the use of the wheel construction of this invention is limited thereto, but because a sugar cane cart imposes a heavy load upon a wheel and due to the use of the cart over very rough terrain, considerable lateral shock and thrust are imparted to the wheel in addition to the load carried thereby. The wheel construction 10 of this invention is extremely sturdy and is adapted to readily mount and enable easy dismounting of relatively large pneumatic tires capable of carrying heavy loads.

By way of example only, the wheel construction is ideally adapted for such large pneumatic tires as an aircraft landing gear tire 56 x 16 which is commonly employed as the landing gear tire of a B52 bomber. In heavy duty tires of this size, it is very important that some means be provided to facilitate the mounting of the tire upon or the demounting of the tire from the wheel and further to insure that the tire once mounted will be securely locked in place upon the wheel. These purposes are attained in the preferred wheel construction forming the subject matter of this invention to be now described.

Referring primarily to FIGURE 2 it will be noted that the wheel construction 10 upon which the pneumatic tire 12 together with its inner tube 15 are mounted consists of a cylindrical hub 16 of any suitable size and construction and which is secured as by bearing assemblies 18 upon an axle 20 which may support the vehicle 14 or some other apparatus or machine.

The inner tube 15 is shown provided with a valve stem 22 of suitable character, with the inner tube being mounted in and encircling a cylindrical rim 24 having a medially disposed recessed or drop centered portion 26 with an aperture 28 therein through which the tire stem 22 extends. The rim 24 as mentioned is cylindrical and preferably of one-piece construction and has each of its marginal portions folded or turned inwardly upon itself with a 180 degree bend to provide inturned marginal flanges 30 which provide a double thickness of metal at the edge of the rim and project radially from the outer surface of the rim to provide a stop or locking flange for a purpose to be subsequently apparent.

Means are provided for fixedly and rigidly securing the rim to the hub 16. For this purpose, a preferred embodiment includes a pair of circular disks, each indicated by the numeral 32. At their radially outer edges the disks are secured and intimately bonded as by welding at 34 upon the exterior surface of the disk and at 36 on the interior surface of the disk to the inner cylindrical surface 38 at one marginal edge of the rim 24. One of these disks is secured by the welding 34 and 36 at both its outer and inner surfaces to the rim as shown at the left in FIGURE 2. The other disk 32 is secured solely by the welding 34 at its outer side, and conveniently one disk is provided with an opening 39 therethrough by means of which access is had to the valve stem 22 for inflating the tire or deflating the latter as may be necessary.

At its inner end, each of the disks is provided with a series of apertures 40 in circumferentially spaced relation and which provides access to the exterior face of a disk or plate 42. As will be noted, there are provided two such plates in axially spaced relation upon the hub 16, these plates being welded in place as by the welding seams or beads 44.

It will be noted that each disk 32 is centrally apertured to receive therein the hub 16 with the inner periphery of this aperture 46 being outturned to form a cylindrical flange 48 which lies upon a corresponding surface of the hub. Welding as at 50 serves to intimately bond this outturned flange of the disk directly to the hub, while other welding as at 52 bonds the inner surface of the disk 32 on the left side of FIGURE 2 to the periphery of the plate 42. Each of the apertures 40 is likewise filled with welding material 54 by which the disks are secured to the plate 42. It will thus be apparent that the two disks are homogeneously united by welding directly to the interior cylindrical surface 38 of the rim 24 and to the mounting plate 42 and to the hub 16.

It will be noted from FIGURE 2 that the two disks 32 are relatively convergent from their outer ends at the rim to their inner ends at the hub so that the entire structure of hub and disk lies within the outside edges of the rim.

In constructing this wheel assembly, it will be understood that the left-hand disk is secured to the hub and the rim, being welded at both the inside and outside of the disk. Thereafter the disk at the right side is applied and this disk is of course necessarily welded only at the exterior of the disk to the hub and rim.

Cooperating with the exterior cylindrical surface 60 of the rim 24 and with the inturned marginal flanges 30 are a pair of tire retaining rings each indicated generally by the numeral 62. These rings are of identical construction and as will be more readily apparent from FIGURE 5 comprise each a split ring whose two extremities are in closely adjacent relation to define the split therebetween as at 64. The ring is L-shaped in cross-section consisting of a cylindrical wall 66 adapted to slidably embrace the rim 24 upon its exterior surface 60 and an annular wall 68 which projects radially from the cylindrical wall 66 and terminates in an outwardly flaring lip portion 70.

Figure 3:
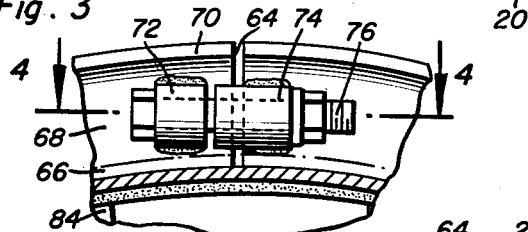
FIGURE 3 is a detailed view taken substantially upon the plane indicated by section line 3—3 of FIGURE 2 and showing in vertical section upon a somewhat enlarged scale the locking means by which the retaining flanges are releasably secured to the rim of the wheel.
Figure 4:
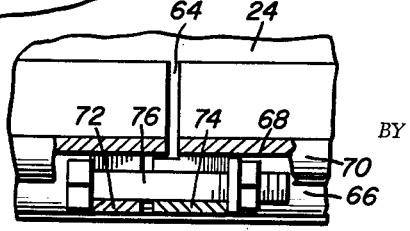
FIGURE 4 is a further detailed view in horizontal section taken substantially upon the plane indicated by section line 4—4 of FIGURE 3.

Across the split 64 in the retaining flange or ring 62 there are provided a pair of apertured lugs 72 and 74 in which is removably received a fastener in the form of a bolt as at 76. The lugs are disposed upon the annular wall 68 and project laterally therefrom as will be readily apparent from FIGURES 2–4.

Although the ring or retainer flange 62 is relatively stiff, it has sufficient deformability and resilience to enable it to be radially expanded or contracted. When the tensioning force of the fastener 76 is released, the ring will be sufficiently expanded to enable it to pass over the stop marginal flanges 30 whereby the ring may be taken off from the rim and thus enable a tire 12 and tube 15 therein to be applied to or removed from the rim. However, when the fastener 76 is tensioned, the flange will be radially contracted to cause its cylindrical wall 66 to frictionally and immovably compressively engage the cylindrical surface 60 upon the exterior of the rim with the vertical annular wall 68 engaged and abutted against the marginal flange 30, the rim will be securely held in position as shown in FIGURE 2 and thus retain the tire and tube upon the device.

Even without the fastener, the inflated tire will by its own pressure retain the cylindrical wall 66 in close engagement with the exterior surface 60 of the rim and also retain the vertical or annular wall 68 abutted against the end of the inturned marginal flange 30 to thus securely lock the tire in place. The locking means 76, however, provides an additional safety feature for this device.

In the embodiment of FIGURE 1–5, two disks 32 were employed to rigidly secure the rim in fixed relation to the hub 16. However, the invention can also be successfully practiced by using two sets of spokes to perform the same function. Thus, as shown in the embodiment of FIGURES 6 and 7, the rim 24 which is identical in construction as previously set forth and therefore to which the same reference numerals have been applied to designate the same parts, is fixedly secured to the hub 16 by two sets of generally radially extending spokes 80. The spokes of each set are directly welded as to the inner ends as at 82 to the hub and at their outer ends are welded as at 84 to the inside surface 38 of the rim. The two sets of spokes are inwardly convergent, that is, their outer ends are secured to the inner cylindrical surface of the rim adjacent the marginal edges thereof in circumferentially spaced relation thereabout, while the inner ends are secured directly to the hub 16 in marginally spaced relation thereabout. As in the preceding embodiment, the support means consisting of the spokes 80 converge inwardly from the outer ends engaging the rim to their inner ends engaging the hub so that the entire assembly of the spokes and the hub are all housed within the confines of the rim as will be apparent from FIGURE 7.

The same construction of retaining flanges 62 previously mentioned are employed in this embodiment of the invention, the flanges being omitted from a showing of FIGURE 7 in the interest of simplicity of illustration. The same safety lock 72, 74 and 76 is likewise provided.

The operation of this form of the invention is identical to that previously described except that in place of solid disks 32 there are employed two sets of radially extending spokes 80.

In its broadest aspect, this invention provides a novel and extremely sturdy construction of a wheel in which a rim is secured to a central hub by two axially spaced fixed support means for the disks or spokes. A further important feature of the invention resides in the means for removably securing the retaining flanges 62 upon the rim of a wheel, including the inturned, marginal stop flanges 30 which limit the axial outward movement of the retaining flanges from each other under the internal pressure of the tire mounted therebetween, together with the locking means which fixedly secure the retaining flanges in their abutted position against the locking flanges.

The foregoing is consideration as illustrataive only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A wheel construction for pneumatic tires comprising a hub, a cylindrical rim surrounding said hub and having a continuous smooth convex outer surface broken only by a drop center consisting of a medial, radially inwardly recessed portion for seating a tire inner tube thereon, means fixedly securing said rim to said hub, the marginal edges of said rim being folded through 180° back upon the convex outer surface of said rim and providing fixed marginal flanges upon said outer cylindrical surfaces, a pair of L-shaped retaining flanges having an axially extending cylindrical wall and a radially extending annular wall, said annular walls embracing the outside walls of the beads of a pneumatic tire therebetween and abutting said marginal flanges, said flanged cylindrical walls slidably embracing said cylindrical rim and being disposed beneath said tire beads, said retaining flanges each comprising a split ring which is sufficiently circumferentially and radially expansible and deformable for movement in its expanded condition over said marginal flanges and slidable freely transversely of said rim continuous smooth surface, a releasable fastener secured to each retaining flange on opposite sides of the split thereof for radially contracting said retaining flange into a fixed, non-slipping compressive engagement upon said rim.

2. The combination of claim 1 wherein said fasteners comprise apertured lugs mounted on said annular wall and projecting laterally outwardly therefrom, fastening members engaged in said apertured lugs and releasably and tensioningly secure the adjacent ends of said retaining rings together.

3. The combination of claim 1 wherein said securing means comprises a pair of axially spaced plates each fixedly mounted upon said hub intermediate the ends thereof, members each fixedly secured to one of said plates and to the inner surfaces of said rim inwardly from the adjacent edges of the latter.

4. A wheel construction for pneumatic tires comprising a hub, a pair of axially spaced plates mounted upon said hub and projecting radially therefrom and fixedly bonded thereto, a cylindrical rim surrounding said hub and having tire retaining flanges upon its outer cylindrical surface, a pair of axially spaced disks surrounding said hub and disposed within said rim, said disks having each a central opening surrounding said hub and having a cylindrical outturned flange at the periphery of said central opening and embracing said hub, said disks being convergent from said rim toward said hub, means fixedly bonding said disks at their outer peripheries to the inner cylindrical surface of said rim adjacent a marginal edge of the latter, means fixedly bonding each disk at its central portion adjacent said central opening to one of said plates upon the external surface thereof and means fixedly bonding said disk outturned flanges to said hub.

5. The combination of claim 4 wherein said tire retaining flanges project radially outwardly from said rim each adjacent a marginal edge thereof, at least one of said retaining flanges being radially expansible and contractible and releasably secured upon said rim.

References Cited in the file of this patent

UNITED STATES PATENTS

| | | |
|---|---|---|
| 802,703 | Midgley | Oct. 24, 1905 |
| 828,223 | Leisenring | Aug. 7, 1906 |
| 1,058,332 | Rabbers | Apr. 8, 1913 |
| 1,610,731 | Barth | Dec. 14, 1926 |
| 2,005,628 | Maranville | June 18, 1935 |
| 2,542,455 | Ash | Feb. 20, 1951 |
| 2,614,603 | Howley | Oct. 21, 1952 |

FOREIGN PATENTS

| | | |
|---|---|---|
| 567,043 | Germany | Dec. 27, 1932 |
| 513,476 | Italy | Feb. 5, 1955 |